United States Patent [19]

Fay

[11] 4,435,469
[45] Mar. 6, 1984

[54] HOT MELT ADHESIVE FOR BONDING PAPER TO GLASS FIBER

[75] Inventor: Ralph M. Fay, Lakewood, Colo.

[73] Assignee: Manville Service Corporation, Denver, Colo.

[21] Appl. No.: 372,605

[22] Filed: Apr. 28, 1982

[51] Int. Cl.³ .......................... C08K 5/01; C08K 3/26; C08K 7/10; C09J 3/14
[52] U.S. Cl. ................................... 428/285; 524/427; 524/480; 524/488; 524/489; 428/348
[58] Field of Search ............... 524/427, 480, 488, 489; 428/348, 285

[56] References Cited

U.S. PATENT DOCUMENTS

| | | | |
|---|---|---|---|
| 3,245,930 | 4/1966 | McDowell et al. | 524/480 |
| 3,583,936 | 6/1971 | Stahl | 524/480 |
| 3,745,054 | 7/1973 | Smedberg | 524/488 |
| 3,860,543 | 1/1975 | Masuda et al. | 260/28.5 AV |
| 3,911,185 | 10/1975 | Wright, Jr. | 428/97 |
| 3,914,489 | 10/1975 | Smedberg | 428/97 |
| 4,120,676 | 10/1978 | Hahn et al. | 65/4 R |
| 4,169,082 | 9/1979 | Kusterer, Jr. | 260/23 AR |
| 4,190,565 | 2/1980 | Cook et al. | 260/27 R |

OTHER PUBLICATIONS

James A. Schlademan "Hydrocarbon Resins in Hot Melt Adhesives" Adhesives Age, pp. 45-48, Aug. 1975.
K. C. Brinker "EVA Copolymers: Raw Materials for Hot Melt Pressure Sensitive Adhesives" Adhesives Age, pp. 38-40, Aug. 1977.
Alexander Brown "Property Composition Profiles of Hot Melt Adhesive Systems" Adhesives Age, pp. 41-43, Aug. 1977.

Primary Examiner—Veronica P. Hoke
Attorney, Agent, or Firm—Ronald M. Halvorsen; Richard K. Thomson

[57] ABSTRACT

A relatively high melting point thermoplastic hot melt adhesive suitable for bonding a paper facing to glass fiber based insulating materials to produce good adhesion and superior water vapor barrier properties, containing in percent by weight:

| | |
|---|---|
| Microcrystalline Wax | 8-12% |
| Synthetic Polyethylene Wax | 8-12% |
| Hydrocarbon Resin | 13-17% |
| Ethylene-Vinyl Acetate copolymer | 6-12% |
| Calcium Carbonate Filler | Up to 65% |
| BHT antioxidant | .002-.004% |

18 Claims, No Drawings

HOT MELT ADHESIVE FOR BONDING PAPER TO GLASS FIBER

This invention relates to hot melt adhesives and more particularly to hot melt adhesive formulations suitable for bonding cellulosic fiber based materials with loosely packed fibrous materials such as fiber glass insulating materials, and the like, which are then suitable for use as thermally insulating building products.

BACKGROUND OF THE INVENTION

Thermoplastic hot melt adhesives have been used in a wide variety of applications for many years. These formulations have generally been thermoplastic materials which are coated from a heated melt and solidify when cooled to produce a uniform coating of the adhesive, which subsequently can be softened to permit other materials to be bonded thereto when the adhesive cools and solidifies. Adhesion is thereby achieved by an entrapment mechanism whereby the fluid thermoplastic adhesive, having the proper tacky characteristics, wets the material to be adhered and then solidifies on cooling to form a mechanical bond or a chemical and mechanical bond between the materials.

Solidification of the adhesive by virtue of its cooling can be achieved by cooling the materials being contacted through the adhesive either directly or by permitting the adhesive to lose heat to the materials to be bonded. In either case, the coating and cooling characteristics of the adhesive are generally controlled by careful temperature control of the materials to be bonded, during the process.

In summary, hot melt adhesives achieve their bonding characteristics through cooling as contrasted with other adhesives which achieve adhesion through a solid adhesive by evaporation of a solvent carrier or through other mechanisms such as polymerization.

The ideal hot melt adhesive should be solid and not tacky, at the temperatures which the coated materials or bonded materials would encounter in normal use and storage. This is important where paper products are coated with a hot melt adhesive prior to their use in a bonding process and are thereafter stored for example in a rolled form. Normally a Kraft paper is coated on one side with the hot fluid adhesive in a conventional manner and cooled to a solid layer prior to rolling the coated paper on itself. This places the adhesive layer in contact with the uncoated surface of an adjacent layer of paper. Any tendency of the thermoplastic adhesive to bond to adjacent sheets on the roll under the conditions encountered during the storage of a prepared roll would enable a bond to form between the layers of paper on the roll creating a condition called "blocking". This term aptly describes the undesirable result of a roll of adhesive coated paper which has bonded to the adjacent layers in the roll forming a solid essentially unuseable product. In addition the coating on the paper must be capable of being reheated, as by placing it in contact with a heated material to be bonded to the paper, to make the adhesive tacky for subsequent adhesion of the materials to be bonded when the adhesive solidifies. During such a procedure there should not be any attendant unwanted migrations of the adhesive either on the coated face of the paper or through the paper by wicking action. This latter requirement is also applicable to the initial coating of the paper with the fluid adhesive.

The kind and amounts of constituents used in hot melt adhesive formulations have varied widely depending upon the physical characteristics of the raw materials, the intended use or application of the adhesive and economic or cost considerations. Generally, suitable formulations for bonding paper products to glass fiber mats, batts or blankets have included thermoplastic polymer resins in combinations with microcrystalline waxes, paraffin waxes, and hydrocarbon resins. Suitable polymers have included polyethylene, polyvinyl acetate, ethylene-vinyl acetate (EVA) and ethylene-ethylacrylate (EEA) co-polymers.

It has been recognized that for this application there are several additional characteristics to these required for other applications, which are necessary for hot melt adhesives to exhibit when attempting to formulate particular adhesives useful for bonding glass fibers to paper. It is not sufficient to evaluate merely the coating ability, bonding strength or the like. Typically, the viscosity of the thermoplastic adhesive in the fluid state at the temperature of application or the temperatures encountered during the process of adhering one material to another, is extremely important for several reasons. The properties known as adhesive tack and the wetting ability of the fluid melt on the material to be coated or adhered, are related to viscosity at the temperatures encountered during application. This can have profound effect on both the initial adhesion to the paper and the ultimate bonding strength. This property will then establish the suitability of the adhesive for use with particular materials. For example, formulations which produce very low viscosity thermoplastic adhesive melts at the temperatures of application or use can produce an undesirable wetting action on a paper substrate such that the fluid adhesive can bleed through the paper. This diminishes its availability for subsequent adhesion when another material is pressed against its adhesive coated face. In addition this bleed through, will produce undesirable asthetic qualities in the final paper faced product. While such a wicking or bleeding through of a waxed based formulation may be desirable in the production of waxed paper, it is undesirable if it occurs in a non-uniform fashion or deprives the adhesive coated surface of the paper of a sufficient adhesive coating for accomplishing the desired mechanical bonding upon cooling or solidification of the adhesive. Generally, the inclusion of higher molecular weight polymers in the thermoplastic adhesive formulation will tend to produce higher viscosity melts at given temperatures of use.

With the foregoing in mind it is important that a balance must be struck when selecting components and proportions of components in any given formulation. Selection of a polymer of a given molecular weight to produce ease of application at a given temperature level may adversely affect the ability of the final formulation to provide a sufficiently sticky or tacky property for particular applications. This last property can be improved by addition of other components, sometimes termed tackifiers, in combination with miscible diluent waxes and fillers or extenders. In this manner, the diluent system provides a variety of effects depending on the kinds of diluents and their concentration in a particular formulation. Generally the diluent acts as a vehicle for the polymer and tends to lower the melt viscosity of the hot melt at the temperatures employed to make it more covenient to apply. In addition, if properly formulated into the hot melt compositions, diluents can enhance the wetting ability and adhesive strength of the polymer in addition to providing the required tack or tackiness or tack range for the adhesive in the fluid or semi-fluid state at the temperatures encountered during coating and use.

Important attributes are also provided to the overall combination of materials from the selection of the other individual components and their proportions. The water vapor barrier property of the adhesive in the finished product is also an important property for the herein described application.

In general, it is believed that the polymer component of a hot melt adhesive formulation forms the back bone of the composition but the exact properties of the final product cannot be predicted with accuracy from the selection of the polymer alone because of the contrubtions made by the other components to all the essential properties required of the hot melt product in use. Therefore, the molecular weight and concentration of the polymer in the system may vary considerably depending on the other materials present and the ability of the system to exhibit the desired properties can often be achieved only after extensive experimentation. It is not possible to merely select components and proportions of components according to some well defined lows or prior empirical experience when preparing a new formulation for achieving specific and different properties.

In building insulating materials, the thermoplastic adhesive, ideally, should act as both an adhesive and a barrier to transmission of the water vapor in the air through the finished product. If the hot melt adhesive formulation selected does not exhibit this property in both the creased and uncreased condition, other materials would then have to be incorporated into the product to provide this necessary property thereby increasing the cost of the resultant product to the consumer.

It is therefore an object of the present invention to provide a low cost hot melt adhesive suitable for adhering a paper facing to fiberous thermal insulating material, such as glass fiber insulating materials, which is capable of being applied, without undersirable bleeding through the paper, at the temperatures normally encountered both during coating and at the point in the manufacture of glass fiber insulating material where a paper facing is applied to the fiber glass insulating material. It is also an object of the present invention to provide such a hot melt adhesive composition which eliminates the current need for supplemental cooling of the glass fiber insulating product prior to the step of adhering the fibers to the adhesive coated face of a paper backing material. It is also an object of the present invention to provide in the final product a water vapor barrier which is superior to that obtained from similar hot melt adhesives capable of only being applied at a lower temperatures i.e. after cooling the glass fiber insulating material.

SUMMARY OF THE INVENTION

It has been discovered that specific proportions of a blend of microcrystalline wax, synthetic polyethlene wax, hydrocaborn resin, ethylene-vinyl acetate copolymer, calcium carbonate filler and an antioxidant, produces a hot melt adhesive suitable for adhering 20–45 pound Kraft paper to fiber glass insulating material, when the Kraft paper is coated to a thickness of 15 to 30 pounds per 3000 square feet at a temperature of from between about 200 degrees F. to about 400 degress F., to provide a final product which has water vapor barrier properties superior to that obtained from prior art hot melt adhesive compositions having lower melting point temperatures.

DETAILED DESCRIPTION OF THE INVENTION

Typically, a fiber glass insulating material suitable for thermal insulating applications is produced during a process such as that described in U.S. Pat. No. 4,120,676 which is incorporated herein by reference. Such a process generally provides for the cooling of the fiber glass produced from a temperature of at least about 180 degrees F. to something less than 140 degrees F. before currently used hot melt adhesives can be successfully employed to bond the fiber glass product to the paper facing to achieve merely the adhesive properties sought. Attempts to apply existing hot melt adhesive formulations at temperatures above 140 degrees F. have resulted in undesirable bleed through of the adhesive on the paper and insufficient mechanical bonding since the tackiness and subsequent hardening characteristics of the adhesive did not provide a suitable mechanical bond of the fibers to the paper. As stated previously herein, the viscosity and tackiness of the prior adhesives used for this purpose were inadequate for successful use above 140 degrees F. Simply increasing the molten viscosity of the polymer employed by the selection of a higher molecular weight polymer or using a greater proportion of polymer in the melt has been found however to not improve tack, nor to increase the temperature range of application nor improve the wetting ability of the adhesive for the insulating fibers. Likewise, decreasing the diluent components is undersirable since they generally help to provide the requisite tack and wetting ability, and further help to contribute to the vapor barrier properties of the finished product.

Surprisingly, the proper combination of properties has been achieved utilizing the following formulation:

TABLE I

| BY WEIGHT | |
|---|---|
| Microcrystalline Wax | 8–12% |
| Synthetic Polyethylene Wax | 8–12% |
| Hydrocarbon resin | 13–17% |
| Ethylene-vinyl acetate copolymer | 6–12% |
| Calcium Carbonate Filler | 50–65% |
| BHT antioxidant | .002–.004% |

In the foregoing composition, the microcrystalline waxes of choice are derived from refined fractions of crude oil and therefore consist primarily of paraffinic hydrocarbons which contain significant amounts of branched chain and cycloparaffins as well as aromatics. This composition of components is characterized by exhibiting the formation of only small crystalline regions in the solid wax so that these waxes, as compared to paraffin waxes with fewer branched and cyclic groups, are generally softer and more flexible than an otherwise comparable paraffin wax having a similar melting point or range.

Typically microcrystalline waxes that are suitable for use in formulating the hot melt adhesive of the present invention are Shellmax 905 brand supplied by the Shell Chemical Company of 600 Summer Street, Stamford, Connecticut 06904; Micro Hex R brand supplied by the Witco Chemical Corporation, Sonneborn Division, 277 Park Avenue, New York, New York 10017; and Victory brand wax supplied by Petrolite Corporation, Bareco Division 6910 E. 14th Street, Tulsa, Oklahoma 74112. Other microcrystalline waxes can be selected from other suppliers as long as the wax selected exhibits properties similar to those for Shellmax 905 which are summarized in the following Table II:

TABLE II

Physical Properties Microcrystalline Wax

| Property | ASTM Test METHOD | Values |
|---|---|---|
| Melt Point of | D-127 | 174° F. ± 5 |
| Color, ASTM | D-1500 | 1.0–8.0 |
| Flash Point C.O.C.,°F. | D-92 | 580° F. |
| Penetration, Needle @ 77° F. | D-1321 | 30 ± 6 |
| Oil Content, % Wt. | D-74 | 3.0 ± .6 |
| Refractive Index @ 100° C. | D-1747 | 1.4420 |
| lbs. per Gal. @ 60° F. | | 7.51 |
| @ 210° F. | | 6.50 |
| Viscosity, Saybolt @ 210° F. | | 100 min. |

The synthetic polyethylene wax used in this invention has been selected in place of the paraffin waxes found in some prior art hot melt adhesives used for similar purposes. Polyethylene waxes (P.E. waxes) which might be beneficial for raising the softening point of adhesive formulations are normally not broadly compatible with the constituents of such prior art formulations, and indeed tend to separate out of such formulations when they are molten. Surprisingly, in the proportions employed in the adhesive formulation described herein, polyethylene waxes having a melting point in °F. (as determined by ASTM D-127) between about 215 degrees F. and 235 degrees F. are found to be miscible in the formulation of the present invention, when molten. Typically the synthetic polyethylene waxes of choice for use in the present invention will have an ASTM D-1321 penetration at 77 degrees F. of from 1 to 3 and a viscosity in cps at 300 degrees F., (according to ASTM D-2669) of from about 6 to about 11. Commerical preparations suitable for use in the present invention include the Polywax brand 655 and 1000 grades obtained from the Petrolite Corporation, Bareco Division, 6910 E. 14th Street, Tulsa, Ok. 74112.

The hydrocarbon resin suitable for use with the other constituents described herein in the proportions indicated can be either chemically inert and have little or no aromatic content, or can be selected from chemically inert, nonsaponifiable alkylated resins which are totally aromatic. In either case the typical average molecular weights should lie within the range from about 430 to 1200 in the case of the aromatic hydrocarbon resins and from about 550 to about 950 in the case of the non-aromatic resins. The Neville Chemical Company's brands LX-1122 and LX-1082 of non-aromatic resins and Nev. Chem 100 Brand of aromatic resin have been found suitable for use with the other constituents of the present invention in the proportions disclosed to achieve the results described herein. The physical properties of these materails are summarized in Table III.

TABLE III

Physical Properties Hydrocarbon Resins

| Brand | Property | Value |
|---|---|---|
| LX 1082 | Softening Point °C. Ring and Ball ASTM E-28 | 102 |
| | Specific Gravity @ 25° C. ASTM D-71 | 1.080 |
| | Iodine Number ASTM D-1959 | 140 |
| | Flashpoint of C.O.C. ASTM D-92 | 425 |
| | Molecular wt. Average ASTM D-2503 | 685 |
| LX 1122 | Softening Point °C. (same as above) | 100 |
| | Iodine Number (same as above) | 105 |
| | Specific Gravity @ 25° C. | 1.050 |
| Nev Chem 100 | Softening Point °C. | 103 |
| | Specific gravity | 1.063 |
| | Iodine Number | 51 |
| | Flash Point °F. | 415 |
| | Molecular Wt. | 640 |

A wide range of ethylene-vinyl acetate copolymer containing hot melt adhesive formulations have successfully been prepared and used for many applications. These so-called EVA copolymers are available in various vinyl acetate contents and melt indices. Generally a high melt index will correspond to a low melt viscosity. The melt index represents the measurement of the mass flow of the particular material through a standard capillary die under standard temperature and pressure conditions in a given time.

Generally, EVA polymers having a broad range of melt indexes have been used in hot melt formulations in concentrations of from about 18% EVA by weight to about 40% by weight. In the formulation of the present invention only between 6% to about 12% by weight of the ethylene-vinyl acetate polymer component is utilized. Preferably the commerically available materials listed in Table IV have utility in the present invention.

TABLE IV

TYPICAL PROPERTIES

| | "ELVAX" 4260 | "ELVAX" 250 | "ELVAX" 260 |
|---|---|---|---|
| Melt Index | 5.0–7.0 | 22.0–28.0 | 5.3–6.7 |
| % Vinyl Acetate | 27.0–29.0 | 27.2–28.8 | 27.2–28.8 |
| Density @ 23° C. kg/m$^3$ (g/cm$^3$) ASTM D 1505 | 955(0.955) | 951 | 955 |
| Tensile Strength MPa (psi) ASTM D 1708 | 19(2 700) | 11 (1 600) | 24 (3 500) |
| Elastic (Tensile) Modulus, MPa (psi) ASTM D 1708 | 10 (1 500) | 19 (2 800) | 26 (3 800) |
| Hardness, Shore A-2 Durometer, 10 sec ASTM D 2240 | 80 | 75 | 80 |
| Softening Point, Ring & Ball °C.(°F.) ASTM E 28 | 158(316) | 127 (260) | 154 (310) |
| Cloud Point in Parraffin Wax °C.(°F.) | 99(210) | 66 (150) | 66 (150) |

The filler material of choice in the formulation of the present invention is calcium carbonate. Inorganic fillers normally help to improve the cost of the adhesive and contribute to an increase in melt viscosity. Higher proportions of fillers in hot melt formulations tend to reduce tack, so compositions such as disclosed herein must normally be formulated to account for the deleterious effects normally encounterd when greater than 20% by weight of filler is used. In addition fillers normally has to be selected which had very small average particle sizes to achieve adequate mixing and avoid settling. Surprisingly, it has been found that relatively large size particles of calcium carbonate in very large concentrations can be used advantageously in the hot melt compositions of the present invention. Typically, average particle sizes of from 3 to 11 microns can be employed in formulations according to the present invention containing up to 65% by weight of the calcium carbonate without losing the requisite tack. Commercial preparations of calcium carbonate are available from the Campbell-Grove Division of Flintkote of Hunt Valley, Maryland 21031 under the brand names Camel-WITE and Camel-KOTE. Tese materials exhibit the physical properties listed in Table V.

TABLE V

|  | Camel-WITE | Camel-KOTE |
|---|---|---|
| Specific Gravity | 2.70-2.71 | 2.70-2.71 |
| One Lb. bulk gallons | 0.0443 | 0.0443 |
| Wt. per Solid Gal. (lbs) | 22.57 | 22.57 |
| pH of Saturated Sol. | 9.5 | 9.5 |
| Index of Refraction | 1.6 | 1.6 |
| Oil Absorption (cc/100 g) (Approx) | 15 | 10 |
| Average Particle Dia. (Micron) | 3.0 | 11.0 |
| Particle Range (Micron) | 0.3 to 12.0 | 0.4 to 25.0 |
| Dry Brightness (Hunter Refl.) (Min.) | 95 | 93 |
| Bulk Density (Loose) lbs./cu. ft. (Approx.) | 40 | 50 |
| Solubility in water (%) | 0.08 | 0.04 |
| Mho Hardness | 3.0 | 3.0 |

The hot melt adhesive composition or blend of the present invention remains stable with the additions of 0.002% to 0.004% by weight of an antioxidant such as BHT (butylated hydroxytoluene) at temperatures on the order of 200 degrees F. to 400 degrees F. For extended periods of time. Even though the relatively high volatility of BHT normally limits its selection for use in higher temperature hot melt formulations, it has been found that the unusually small amounts of BHT described herein are effective to achieve the reuisite thermal stability required in the present formulation having a higher melt temperature than typically used in the described applications.

Overall it can be seen that the formulation of the present invention requires less in the way of polymeric material, hydrocarbon resin, PE wax and microcrystalline wax than would be expected when trying to obtain a higher temperature melt i.e. one capable of being used to bond glass fibers to paper at temperatures between 140 degrees F. and 190 degrees F. having the requisite tack, viscosity and limited wicking or bleed through that is required for successful economical adhesion of the paper web to the fiber glass insulating material.

In addition, the formulation of the present invention produces a product which has superior water vapor barrier properties when compared to compositions which have lower melt temperatures and which therefore require a cooling step to cool the glass fibers prior to successful application to a paper facing.

Preferably, a formulation according to the present invention would consist of the following:

| Microcrystalline Wax | 8-12% |
|---|---|
| Synthetic Polyethylene Wax | 8-12% |

-continued

| Hydrocarbon Resin | 13-17% |
|---|---|
| Ethylene-Vinyl Acetate Copolymer | 6-12% |
| Filler and Antioxidant | Balance |

The prior art formulation used for comparison with the foregoing consists of:

| HiTest Paraffin | 15 parts by weight |
|---|---|
| Shellmax 905 | 5 |
| Piccomer XX100 | 16 |
| Elvax 250 | 4 |
| Camel-WITE | 60 |

Piccomer XX100 is a brand of hydrocarbon resin commercially available from Hercules Incorporated, Wilmington, Delaware 19899, having a softening point R & B between 94 degrees C. and 100 degrees C., typically about 98 degrees C. and has a density at 25 degrees C. in pounds per gal. (Kg/L) of 9.00 (1.08).

Both compositions were coated on 35 lb. Kraft paper at at 25±2 lbs per 3000 ft$^2$ and a minimum of three samples tested both flat and creased with the following results in perms.

TABLE VI

|  | Average | Std. dev. |
|---|---|---|
| Example I (uncreased) | 0.28 | 0.09 |
| Example I (creased) | 2.38 | 0.26 |
| Prior art (uncreased) | 0.35 | 0.12 |
| Prior art (creased) | 5.41 | 0.47 |

EXAMPLE I

| Microcrystalline Wax (Shellmax 905) | Approximate % by wt 10% |
|---|---|
| Synthethic Polyethylene Wax (Bareco 655) | 10% |
| Hydrocarbon Resin (Neville LX 1122) | 15% |
| Ethylene-Vinyl Acetate Copolymer (Elvax 250) | 6% |
| Antioxidant (BHT) | .002% |
| Calcium Carbonate Filler (Camel-Wite) | Balance |

The foregoing composition when blended by techniuies well known in the art will exhibit on testing, according to ASTM E-28, a ring and ball softening point temperature of 190 degrees F. 0.±5 degrees.

A water-vapor permeability test on the foregoing composition both uncreased and creased was performed according to ASTM E-96-80 using the desiccant method 3.1. The test conditions were 90° F. and 50% Rel. Humidity. The test results are in perm units as described in Table I of ASTM E 96. The lower perm units represent a greater water vapor barrier property i.e. greater resistance to permeability by water vapor. The creased samples were prepared according to the TAPPI method T-512 and then tested according to ASTM E 96-80, as above, under the same 90 degree F. and 50% Rel. Humidity conditions.

The composition of Example I was coated at a temperature of from about 250 degrees F. and 400 degrees while the prior art composition was coated at a temperature of from about 240 degrees F. to 385 degrees F. and both samples were cooled to room temperature prior to the test.

In addition to the foregoing, it has been determined that significant bleed-through occurs with the prior art compositions when used at temperatures equal to or exceeding 140 degrees F. i.e., the temperatures encountered with freshly prepared fiber glass insulating material without cooling. The formation of the present invention did not exhibit objectionable bleed through at temperatures between 140 degrees and 185 degrees F., while providing satisfactory bonding characterisitics without the provision of cooling of the fiber glass prior to application of the hot melt coated Kraft paper to the fiber glass. This elimination of the cooling step in the fiber glass facing operation without sacificing adequate bonding is a significant advantage of the present composition which has hitherto not been attainable with the prior art hot melt composition.

Lastly, the superior water vapor barrier properties exhibited by the hot melt formulations of the present invention, both uncreased and creased, is an unexpected benefit which would normally not be obtained from compositions capable of exhibiting the proper coating characteristics, resistance to bleed-through and proper tackiness and adhesion in higher temperature use. It is particularly significant that all of these properties can be achieved with a formulation that may contain upwards of 65% by weight of inorganic filler.

The foregoing advantages can be achieved by preparing a formulation using standard blending techniques at a temperature in excess of 250 degrees F. and preferrably above 300 degrees F., which is then applied also, using standard coating techniques, to 20–45 lb. kraft paper, either as a continuous layer or otherwise, at temperatures between 250 degrees F. and 400 degrees F. An additional advantage is also achieved from the higher melt point composition of the present invention in that there is a reduced tendency for the thus prepared coated Kraft paper to block when rolled and stored.

The formulation of the present invention as described herein may be varied in composition to some extent while retaining the advantages disclosed herein and specific component may be substituted with other materials with equivalent properties to achieve similar results without undue experimentation. The scope of the invention is therefore limited only to the scope of the claims.

What is claimed is:

1. A hot melt adhesive composition consiting essentially of by weight:

| Microcrystalline Wax | 8–12% |
| Synthetic Polyethylene Wax | 8–12% |
| Hydrocarbon Resin | 13–17% |
| Ethylene-Vinyl Acetate Copolymer | 6–12% |
| Filler and Antioxidant. | Balance |

2. The hot melt adhesive composition of claim 1 wherein the microcrystalline wax has a melt point of approximately 174 degrees F. ±5 degrees F., and a flash point of approximately 580 degrees F.

3. The hot melt adhesive composition of claim 1 or 2 wherein the synthetic polyethylene wax has a melt point between about 215 degrees F. and 235 degrees F.

4. The hot melt adhesive composition of claim 1 wherein the ethyene-vinyl acetate copolymer has a melt index of from about 5 to about 28 and a percentage of vinyl acetate from about 27 to about 29.

5. The hot melt adhesive composition of claim 1 or 4 wherein the hydrocarbon resin has a softening point of about 100 degrees C. to about 103 degrees C. and an average molecular weight of from about 640 to about 685.

6. The hot melt adhesive of claim 1 wherein the filler is calcium carbonate powder having a majority of particle sizes from between about 3 to about 11 microns and which comprises up to 65% of the weight of the composition.

7. A hot melt adhesive coated kraft paper wherein the composition, which consists essentially of by weight

| Microcrystalline Wax | 8–12% |
| Synthetic Polyethylene Wax | 8–12% |
| Hydrocarbon Resin | 13–17% |
| Ethylene Vinyl Acetate Copolymer | 6–12% |
| Filler and antioxidant | Balance (up to 65%) | is coated on said Kraft at a coverage of about 25 ±2 lbs. per 3000 sq. ft.

8. The Kraft paper of claim 7 wherein the microcrystalline wax has a melt point of approximately 174 degrees F. ±5 degrees F., and a flash point of approximately 580 degrees F.

9. The Kraft paper of claim 8 wherein the synthetic polyethylene wax has a melt point of between about 215 degrees F. and 235 degrees F.

10. The Kraft paper of claim 9 wherein the hydrocarbon resin has a softening point of about 100 degrees C. to about 103 degrees C. and an average molecular weight of from about 640 to about 685.

11. The Kraft paper of claim 7 or 10 wherein the ethylene vinyl-acetate copolymer has a melt index of from about 5 to about 28 and a percentage of vinyl acetate from about 27 to about 29.

12. The Kraft paper of claim 11 wherein the filler is calcium carbonate powder having a majority of particle sizes from between about 3 to about 11 microns.

13. The Kraft paper of claim 12 wherein less than 0.004% butylated hydroxy toluene antioxidant is used in the hot melt adhesive.

14. The Kraft paper of claim 7 wherein the Kraft paper is approximately 20 to 45 lb. paper and exhibits a water vapor permeability flat uncreased, measured according to ASTM E 96–80 at 90 degrees F. and 50% relative humidity, of less than 0.3 perms.

15. The Kraft paper of claim 14 wherein the creased water vapor permeability tested according to TAPPI T-512 at 90 degrees F. and 50% relative humidity is less than 3.0 perms.

16. A fiber glass mat adhered to a Kraft paper facing wherein the paper and the fiber glass are intimately contacted at temperatures exceeding 140 degrees F. and the composition adhering the fiber glass mat to the Kraft paper facing consists essentially of by weight:

| Microcrystalline Wax | 8–12% |

| -continued | |
|---|---|
| Synthetic Polyethylene Wax | 8–12% |
| Hydrocarbon Resin | 13–17% |
| Ethylene-Vinyl Acetate Copolymer | 6–12% |
| Filler and Antioxidant. | Balance |

17. The fiber glass and paper article of claim 16 wherein the composition is coated on the paper prior to contact with the fiber glass with a continuous coverage of 25±2 lbs per 3000 sq. ft.

18. The fiber glass and paper article of claim 16 wherein said composition comprises by weight:

| Microcrystalline Wax | about 10% |
|---|---|
| Synthetic Polyethylene Wax | about 10% |
| Hydrocarbon Resin | about 15% |
| Ethylene-Vinyl Acetate Copolymer | about 6% |
| Filler and Antioxidant | Balance. |

* * * * *